(12) United States Patent
Howard

(10) Patent No.: US 11,254,339 B1
(45) Date of Patent: Feb. 22, 2022

(54) CART SYSTEM FOR TRANSPORTING OBJECTS OVER SOFT AND HARD SURFACES

(71) Applicant: Christi Howard, LaGrange, GA (US)

(72) Inventor: Christi Howard, LaGrange, GA (US)

( * ) Notice: Subject to any disclaimer, the term of this patent is extended or adjusted under 35 U.S.C. 154(b) by 23 days.

(21) Appl. No.: 16/785,748

(22) Filed: Feb. 10, 2020

(51) Int. Cl.
*B62B 13/18* (2006.01)
*B62B 3/02* (2006.01)
*B62B 13/04* (2006.01)
*B62B 15/00* (2020.01)
*B62B 5/06* (2006.01)
*B62B 3/04* (2006.01)

(52) U.S. Cl.
CPC ............... *B62B 3/02* (2013.01); *B62B 3/04* (2013.01); *B62B 5/06* (2013.01); *B62B 13/043* (2013.01); *B62B 15/007* (2013.01); *B62B 2205/10* (2013.01); *B62B 2206/006* (2013.01)

(58) Field of Classification Search
CPC ....... B62B 13/00; B62B 13/043; B62B 13/18; B62B 13/16; B62B 15/007; B62B 15/008; B62B 15/009; B62B 2203/006; B62B 2206/006
See application file for complete search history.

(56) References Cited

U.S. PATENT DOCUMENTS

| | | | | |
|---|---|---|---|---|
| 2,595,839 A * | 5/1952 | Gellenbeck | ............. | B62B 13/18 280/7.12 |
| 4,159,119 A * | 6/1979 | Smith | ............ | B62B 13/18 280/9 |
| 6,408,962 B1 * | 6/2002 | Ryckman | ............. | B62B 1/002 180/9.22 |
| 6,543,800 B1 * | 4/2003 | Doran | ............. | B62B 1/18 280/47.18 |
| 10,099,713 B1 | 10/2018 | Hussey | | |
| 10,370,018 B1 * | 8/2019 | Maher | ............. | B62B 13/18 |
| 10,894,556 B2 * | 1/2021 | Dieter | ............. | A63C 17/0026 |
| 2007/0296167 A1 * | 12/2007 | Beswick | ............. | B62B 15/008 280/47.34 |
| 2009/0200762 A1 * | 8/2009 | Whiteley | ............. | B62B 15/008 280/8 |
| 2013/0277927 A1 * | 10/2013 | Harvey | ............. | B62B 15/007 280/19 |
| 2015/0232112 A1 * | 8/2015 | Cates | ............. | B62B 15/008 180/9 |
| 2015/0291202 A1 * | 10/2015 | Love | ............. | B62B 19/02 280/13 |
| 2016/0368518 A1 * | 12/2016 | Farina | ............. | B62B 15/007 |
| 2018/0273077 A1 * | 9/2018 | Hussey | ............. | B62B 15/007 |

* cited by examiner

*Primary Examiner* — Brian L Swenson
(74) *Attorney, Agent, or Firm* — Sanchelima & Associates, P.A.; Christian Sanchelima; Jesus Sanchelima

(57) ABSTRACT

An apparatus for transporting objects over soft and hard surfaces is disclosed. The apparatus includes a cart and a sled. The cart includes a base plate, toggles mounted at a top surface of the base plate, wheels mounted at a bottom surface of the base plate, and a cart handle mounted to the base plate. The sled includes eyelets and cables drawn through the eyelets. Further, the sled includes clips mounted at sidewalls of the sled. The sled is used for holding objects during transportation. The cables are used for pulling the sled over the soft surface for transporting the objects. Further, the sled holding the objects is placed over the base plate, and the toggles are mounted to the clips to mount the sled to the cart. The cart handle is used for pulling the cart over the hard surface for continued transporting of the objects.

9 Claims, 4 Drawing Sheets

CART SYSTEM FOR TRANSPORTING OBJECTS OVER SOFT AND HARD SURFACES

BACKGROUND OF THE INVENTION

1. Field of the Invention

The present invention generally relates to a cart system for transporting objects over soft and hard surfaces. More specifically, the present invention relates to the cart system for transporting objects, such as beach equipment, over varied terrain including soft or hard surfaces such as sand, mud, snow, concrete, brick, cobblestone or asphalt.

2. Description of the Related Art

Several designs for cart systems have been designed in the past. None of them, however, include, a beach cart system comprising a wagon with removable wheels and a central hinge, and a sled with edge mounted eyelets for securing an elastomeric tether. It is known that people when on an outing to a beach usually carry many objects or items from their cars to a selected location on the beach. The objects may include, but not limited to, umbrella, ice chest, swimming gear, towels, chairs, books or magazines, food items, sunscreen and so on. Generally, people use carriers, such as wagons or carts to reduce the number of trips back and forth from their cars to the beach. As known, wagons are suitable for use on hard or paved surfaces, but not for use in sand or other loose soils. The wagons and other wheeled carts frequently become bogged down and difficult to move, or turn over, spilling beach gear, food and beverages onto the ground. In order to carry or transport the objects over soft surfaces such as sand or mud, people prefer to use a sled.

Applicant believes that a related reference corresponds to U.S. Pat. No. 6,543,800 for a transportation apparatus for transporting personal items. Applicant believes another related reference corresponds to U.S. Pat. No. 10,099,713 for a beach sled for transporting items over beach surfaces. None of these references, however, teach of a cart system with a wagon with removable wheels and a sled which allow for both soft and hard surfaces to be traveled along while transporting items.

Although the apparatuses or beach sleds discussed above are capable of transporting the objects over the hard and soft surfaces, they have several problems. For example, when the sled is being used, the user has to carry the wagon. Due to the shape and size of the wagon, it is difficult to carry the wagon. Further, existing apparatuses disclose a complex mechanism to couple the sled to the wagon or cart, making it difficult for the user to mount or demount sled to the wagon when he/she has to shift between hard and soft surface for transporting the objects.

Therefore, there is a need for an apparatus that is simple, easy to mount and demount and capable of transporting objects, such as beach equipment, over varied terrain having soft and hard surfaces such as sand, mud, snow, concrete, brick, cobblestone and asphalt.

SUMMARY OF THE INVENTION

It is an object of the present disclosure to provide a cart system for transporting objects over soft and hard surfaces and that avoids the drawback of known beach carts and/or beach sleds.

It is another object of the present invention to provide a cart system, which is an assembly of a cart and a sled. The sled is used for transporting objects over soft surfaces, and the sled is placed over the cart for transporting objects over hard surfaces. The cart might indicate a carrier or wagon.

It is still another object of the present invention to provide a cart system that can easily be folded for ease of carrying and transportation of the cart system.

It is another object of the present invention to provide a cart system that can easily be folded for ease of storage when not in use.

Features and advantages of the subject matter hereof will become more apparent in light of the following detailed description of selected embodiments, as illustrated in the accompanying Figures. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

With the above and other related objects in view, the invention consists in the details of construction and combination of parts as will be more fully understood from the following description, when read in conjunction with the accompanying drawings in which.

It will be noted that throughout the appended drawings, like features are identified by like reference numerals.

DETAILED DESCRIPTION OF THE EMBODIMENTS OF THE INVENTION

Before the present constructional features and working principal of an apparatus for transporting objects over soft and hard surfaces is described, it is to be understood that this disclosure is not limited to, the particular apparatus comprising a cart and a sled as described, since it may vary within the specification indicated. Various constructional features for transporting objects might be provided by introducing variations within the components/subcomponents disclosed herein. It is also to be understood that the terminology used in the description is for the purpose of describing the particular versions or embodiments only and is not intended to limit the scope of the present invention, which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It should be understood that the present disclosure describes a cart system for transporting objects over soft and hard surfaces. The cart system includes a cart and a sled. The cart includes a base plate, toggles mounted at a top surface of the base plate, wheels mounted at a bottom surface of the base plate, and a cart handle mounted to the base plate. The sled includes a bottom, and sidewalls mounted to the bottom. The sled includes eyelets provided at the sidewalls, and cables drawn through the eyelets. Further, the sled includes clips mounted at the sidewalls. The sled might be used for holding objects at the bottom and sidewalls. The cables are used for pulling the sled over the soft surface for transporting the objects. Further, the sled might be placed over the base plate and the toggles are mounted to the clips to mount the cart to the sled. The cart handle might be used for pulling the cart over the hard surface for transporting the objects. Various features and embodiments of an apparatus for transporting objects over soft and hard surfaces are explained in conjunction with the description of FIGS. 1-6.

Figure 1:
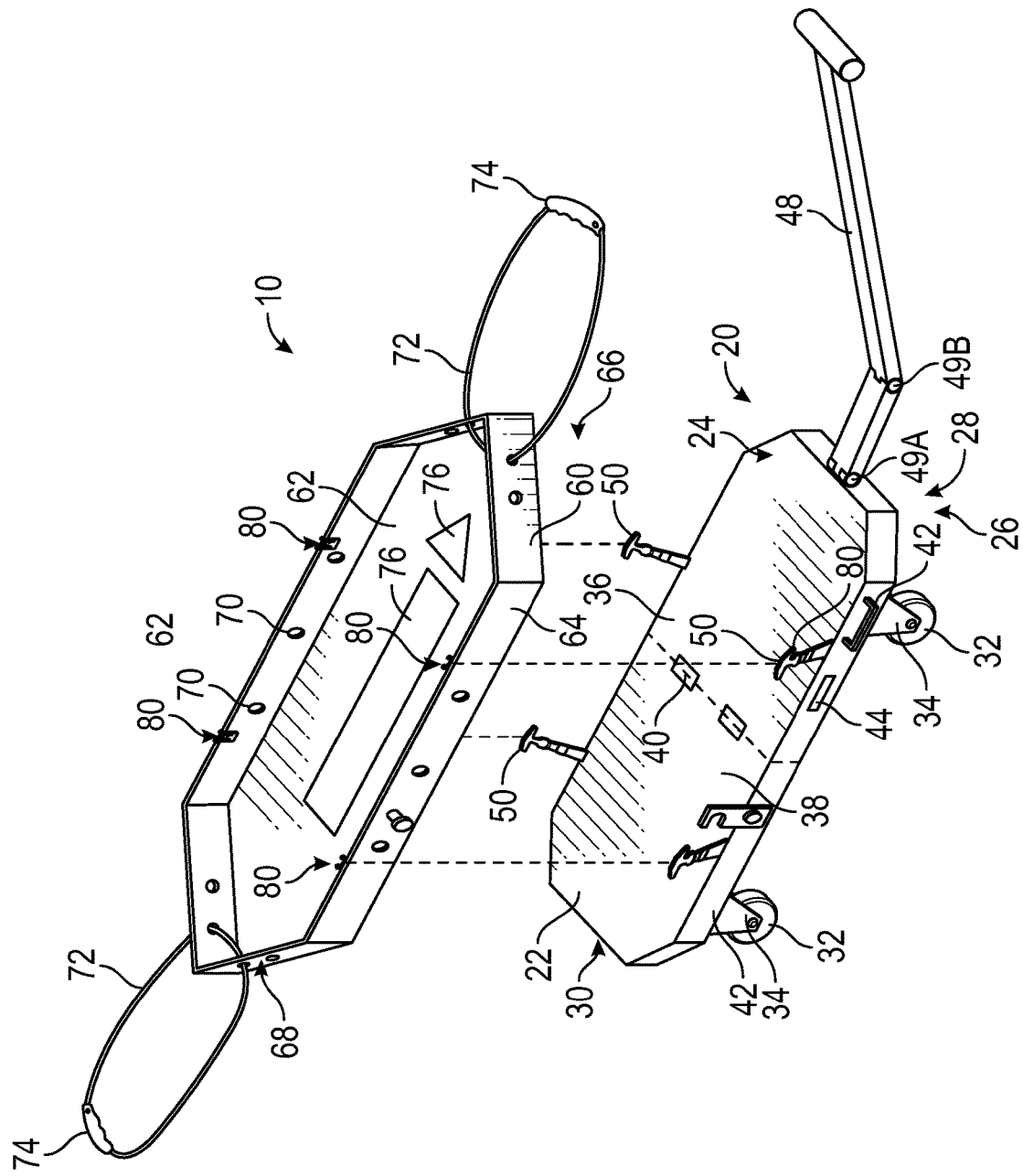
FIG. 1 illustrates an exploded view of an apparatus 10 including a cart 20 and a sled 60 for transporting objects over hard and soft surface, in accordance with one embodiment of present disclosure.

In one embodiment of present disclosure, referring to FIG. 1, an exploded view of an apparatus 10 for transporting objects over soft and hard surfaces is shown. It should be understood that apparatus 10 may also be referred to as a cart system. The apparatus 10 includes a wagon or cart 20. The wagon 20 includes a base plate 22 made of metal, plastic or wood. The base plate 22 might be provided in a variety of shapes. In one example, the base plate 22 might be provided in a square, rectangular, or polygonal shape. The base plate 22 comprises a top surface 24 and a bottom surface 26. The wagon 20 further includes a front end 28 and a rear end 30. The base plate 22 might be provided with wheels 32 at the bottom surface 26. The wheels 32 are mounted to the bottom surface 26 of the base plate 22 with the help of casters 34. In one embodiment, wheels 32 may be removable. In one implementation of the present disclosure, the base plate 22 might be divided into two parts i.e., a first part 36 and a second part 38. The first part 36 and the second part 38 are coupled via a central hinge 40. The central hinge 40 allows the second part 38 to be folded over the first part 36.

Figure 2:
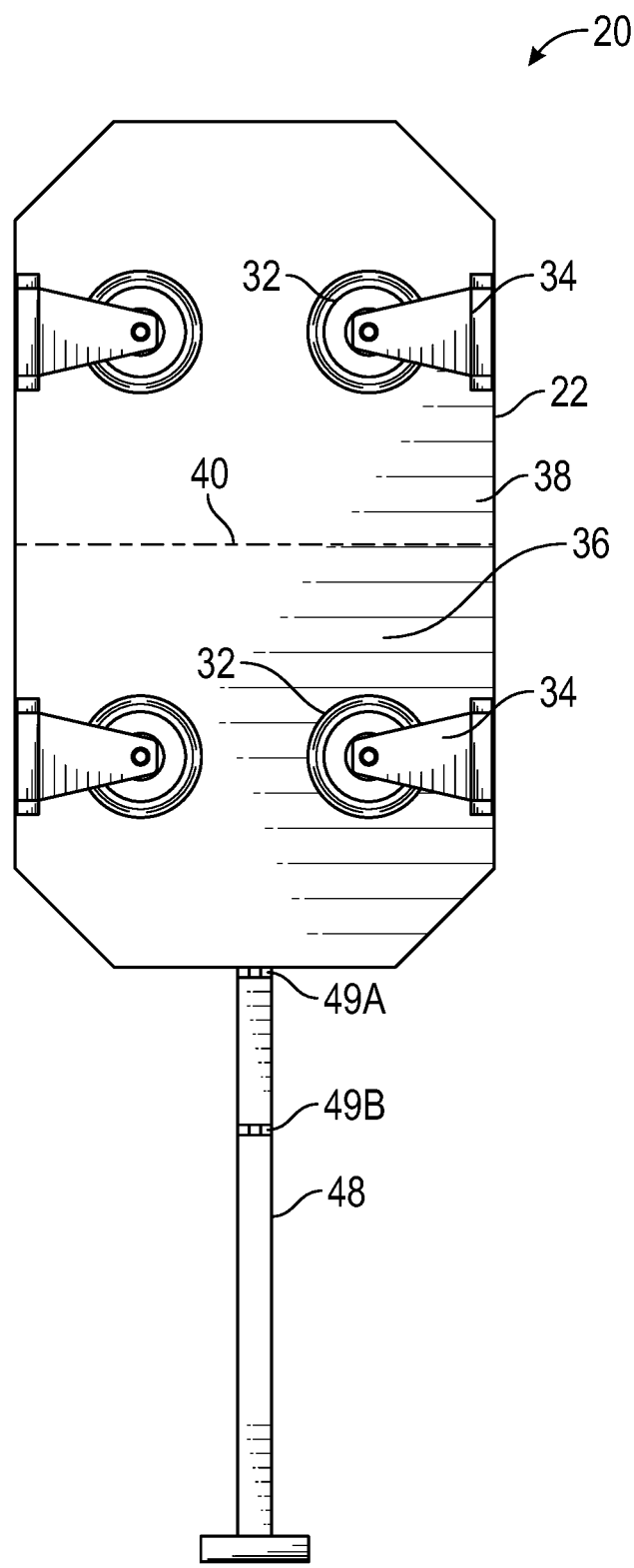
FIG. 2 illustrates a bottom view of the cart 20, in accordance with one embodiment of present disclosure.

Referring to FIG. 2, a bottom view of the wagon 20 is shown. As can be seen, the wheels 32 are placed or retracted over the bottom surface 26 of the base plate 22. Specifically, the casters 34 are bent such that the wheels 32 mounted to the casters 34 are made to sit at the bottom surface 26 of the base plate 22. Further, the base plate 22 might be foldable at the central hinge 40 such that a user can carry the wagon 20 when the wagon 20 is not in use. In order to fold the base plate 22, the second part 38 might be placed over the first part 36 as shown in FIG. 6.

Figure 6:
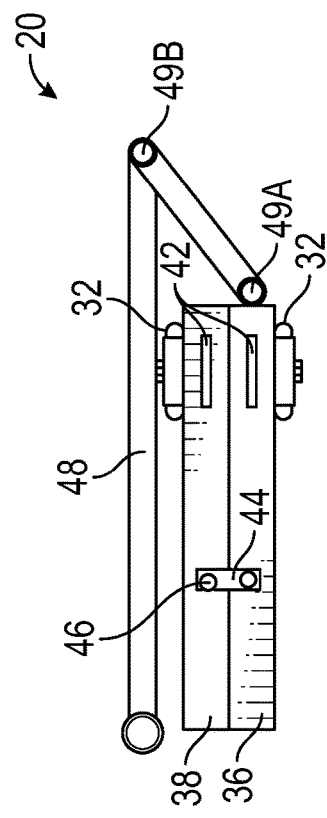
FIG. 6 illustrates a side view of the cart 20 in folded position, in accordance with one embodiment of present disclosure.

Referring to FIGS. 1 and 6, the base plate 22 includes handles 42 at a side of both the first part 36 and the second part 38. The handles 42 might be provided at the far end of the first part 36 and the second part 38. Alternatively, the handles 42 might be provided at center portion of the first part 36 and the second part 38. The handles 42 are provided at the far end of the first part 36 and the second part 38 such that when the second part 38 is placed over the first part 36, the handles 42 are made to align with one another. In one implementation, the handles 42 might be used to carry the wagon 20 i.e., the base plate 22 in folded position.

Further, the base plate 22 includes a latch 44 and a pin 46, as shown in FIG. 6. As can be seen, the latch 44 might be provided at the first part 36 of the base plate 22 and the pin 46 might be provided at the second part 38 of the base plate 22. Further, the wagon 20 includes a cart handle 48 mounted to the base plate 22 at the front end 28 of the wagon 20. The cart handle 48 might be used to pull the wagon 20. In order to pull the wagon 20, the wheels 32 are positioned against the hard surface such as concrete, brick, cobblestone and asphalt, and the cart handle 48 might be used to move the wagon 20 from one place to another. In one embodiment, the cart handle 48 might include cart handle hinges defined as a first cart handle hinge 49A and a second cart handle hinge 49B. The first cart handle hinge 49A might be provided at the end of the cart handle 48 mounted to the base plate 22. The first cart handle hinge 49A might allow the cart handle 48 to bend or move freely such that the user can adjust the position of the handle 48 while pulling the cart 20. The second cart handle hinge 49B might be provided at the cart handle 48. The second cart handle hinge 49B might allow the cart handle 48 to fold down such that the cart handle 48 might be folded down flat on top of the cart 20, as shown in FIG. 6. By folding down the cart handle 48 over the cart 20, it becomes convenient for the user to store and carry the cart from one place to another when not in use. First cart handle hinge 49A and second cart handle hinge 49B help to facilitate moving of the present invention during usage. The user has more control over the present invention with first cart handle hinge 49A and second cart handle hinge 49B.

Figure 3:
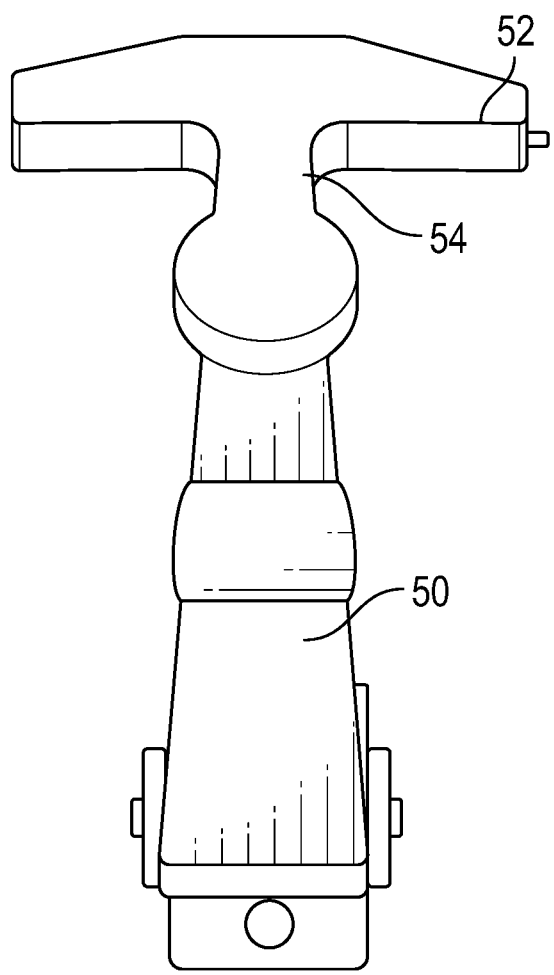
FIG. 3 illustrates a front view of a toggle 50 mounted to the cart 20, in accordance with one embodiment of the invention.

The wagon 20 further includes toggles 50 provided at side of the base plate 22 as shown in FIG. 1. Referring to FIG. 3, the toggles 50 are explained. Each of the toggles 50 includes a head portion 52 and a neck portion 54. Each of the toggles 50 might be mounted to the base plate 22 using known mechanism such as a fastener. Each of the toggles 50 might be tilted around its axis.

Referring back to FIG. 1, the apparatus 10 further includes a sled 60. The sled 60 might be made of metal, plastic, wood or any other suitable material. The sled 60 might be provided in a variety of shapes. In one example, the sled 60 might be provided in a square, rectangular, polygonal shape, or hexagonal shape. The sled 60 includes a bottom 62 and sidewalls 64. The bottom 62 may preferably be convex. It may also be suitable in an alternate embodiment for bottom 62 to be flat. The sled 60 with the bottom 62 and the sidewalls 64 might represent a tray-like structure. The sled 60 further comprises a first end 66 and a second end 68. The first end 66 might indicate a front end of the sled 60. The second end 68 might indicate a rear end of the sled 60. The first end 66 and the second end 68 of the sled 60 might be provided in a triangular shape extending outward as shown in FIG. 1. At the sidewalls 64, the sled 60 might be provided with eyelets 70. The sled 60 might be provided with cables or ropes 72. The cables 72 are drawn through the eyelets 70 for pulling the sled 60. The cables 72 might be elastomeric tethers made of suitable materials. In one implementation, the cables 72 might be provided at both first end 66 and the second end 68 of the sled 60. The cables 72 may be provided in suitable length such that a user will be able to pull the sled 60 with ease e.g., in a standing position. In one example, the cable 72 provided at the first end 66 might be longer than the cable 72 at the second end 68, or vice versa. The cables 72 might be used to pull the sled 60 over soft surfaces such as sand or mud. In order to firmly hold the cable 72, each of the cables 72 might be provided with a grip 74. In addition, the sled 60 might be provided with a pad or base grip 76 at the bottom 62 for providing grip for objects or items placed in the sled 60. The objects may include, but not limited to, umbrella, ice chest, swimming gear, towels, chairs, books or magazines, food items, sunscreen and so on.

Figure 4:
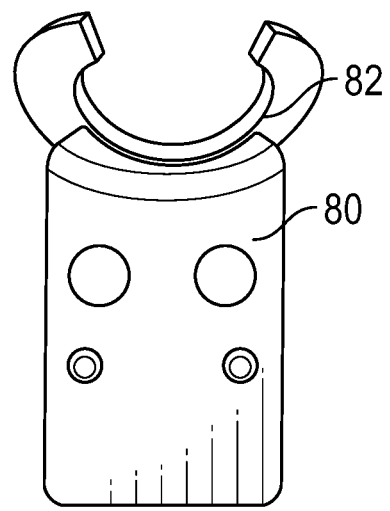
FIG. 4 illustrates a front view of a clip 80 provided at the sled 60 used for mounting the toggle 50 to mount the cart 20 to the sled 60, in accordance with one embodiment of the invention.

In one implementation, the sled 60 might be provided with clips 80 at the sidewalls 64. Referring to FIG. 4, the clip 80 is shown. The clips 80 might be made of metal, plastic or any other suitable material. Each of the clips 80 includes a toggle receiving section or an opening 82. Each of the clips 80 might be mounted to the sled 60 using known mechanism e.g., using a fastener. The clip 80 might be mounted in such a way that the toggle receiving section 82 is made to face outward of the sidewall 64.

Figure 5:
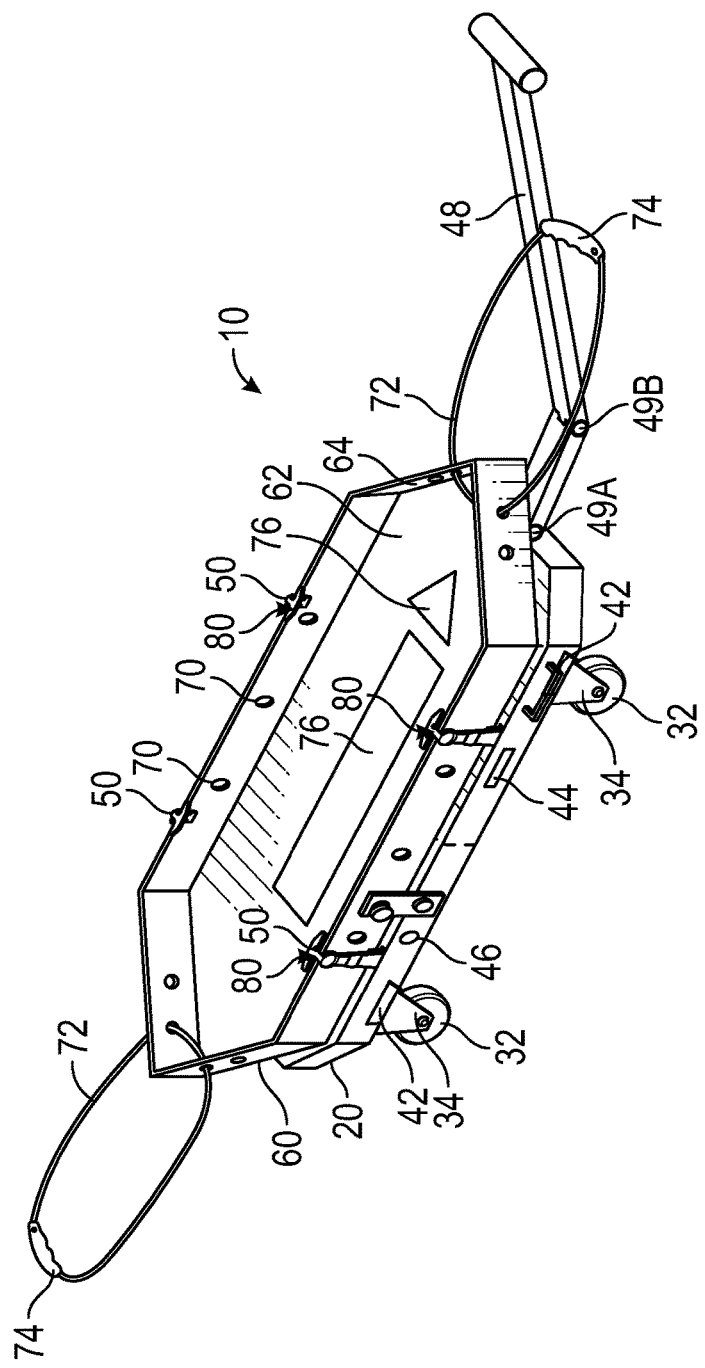
FIG. 5 illustrates a perspective view of the apparatus 10, in which the sled 60 is mounted over the cart 20 for transporting the objects over hard surface, in accordance with one embodiment of present disclosure.

Now referring to FIG. 5, a perspective view of the apparatus 10 in which the sled 60 is mounted over the wagon 20 is shown, in accordance with one embodiment of the present disclosure. The current embodiment is presented to explain transporting of the objects over hard surfaces such as concrete, brick, cobblestone and asphalt. In order to transport the objects over the hard surface, at first, the objects might be placed in the sled 60. Subsequently, the sled 60 might be mounted to the wagon 20. In order to mount the sled 60 to the wagon 20, the bottom 62 of the sled 60 might be placed over the top surface 24 of the base plate 22. After placing the sled 60 over the base plate 22, the toggles 50 are coupled to the clips 80. Specifically, the neck portion 54 of each toggle 50 might be removably mounted to the toggle receiving section 82 of the clip 80. It should be understood that in the current implementation, the toggle 50 acts as a male member and the clip 80 acts as a female member. As such, when the toggles 50 are mounted to the clips 80, the sled 60 might be firmly mounted to the wagon 20. After mounting the sled 60 over the wagon 20, the cart handle 48 might be used to pull the wagon 20 over the hard surface with the help of wheels 32 for transporting the objects.

In order to transport the objects over the soft surface such as sand or mud, the user may demount the sled 60 from the wagon 20. In order to demount the sled 60, the user may demount the toggles 50 from the clips 80 provided at the sled 60. After demounting, the sled 60 holding the objects might be placed over the soft surface e.g., sand. Subsequently, the user may pull hold the cables 72 provided at the first end 66 and pull the sled 60 to transport the objects in the sled 60 in a forward direction. Alternatively, the user may pull the cables 72 provided at the second end 68 to transport the objects in the sled 60 in a rearward direction. As specified above, the bottom 62 of the sled 60 might be provided in flat or convex shaped structure. Preferably, the bottom 62 might be provided in convex shaped structure. Due to convex shaped structure of the bottom 62, it allows the sled 60 to slide smoothly over soft or semi-soft surface when the user pulls the sled 60.

Concurrently or consecutively, when the sled 60 might be used for transporting the objects over the soft surface, the wagon 20 might be folded i.e., the wheels 32 might be folded at the bottom surface 26 of the base plate 22, and the base plate 22 might be folded, as shown in FIG. 6. As specified above, the wheels 32 are folded with the help of the casters 34. Specifically, the casters 34 are bent such that the wheels 32 mounted to the casters 34 are made to sit at the bottom surface 26 of the base plate 22. Further, the base plate 22 might be folded at the central hinge 40. In other words, the second part 38 might be folded over the first part 36. After folding the wheels 32 and the base plate 22, the user can hold the handles 42 and carry the wagon 20, similar to carrying a briefcase while pulling the sled 60 over the soft surface. Upon reaching hard surface, the user may mount the sled 60 over the wagon 20 and transport the objects using the description provided above.

Based on the above, it is clear that the apparatus 10 is an assembly of the wagon 20 and the sled 60, in which only the sled 60 is used for transporting objects over soft surfaces, and the sled 60 is placed over the wagon 20 for transporting objects over hard surfaces. In other words, the wagon 20 helps to transport the sled 60 holding the objects over the hard surface. When the user reaches the soft surface, the user can demount the sled 60 from the wagon 20, and pull the sled 60 over the soft surface. At the time of transporting the objects over the soft surface, the user can fold and carry the wagon 20 with his hands. Due to the construction features of the toggles 50 provided at the wagon 20 and the clips 80 provided at the sled 60, it is easy for the user to mount and demount the toggles 50 from the clips 80. This ensures that the user can switch between soft and hard surface easily in short time for transporting the objects over the soft and hard surfaces.

Further, due to the presence of latch 44 and the pin 46 at the first part 36 and the second part 38, respectively, the base plate 22 might be held firmly in folded position i.e., when the second part 38 is folded over the first part 36. As a result, the user can use the handles 42 provided at the side of the first part 36 and the second part 38 to carry the wagon 20 like a briefcase when he is pulling or transporting the sled 60 over the soft surface.

In one example, the apparatus can be used to transport objects such as beach equipment over soft surface such as beach using the sled. Further, the sled can be placed over the cart to transport the objects over hard surface, such as on the way to the beach over the concrete surface. Similarly, the sled can be used over sand in a desert.

Alternatively, the sled might be used over soft surfaces such as snow. Further, the cart might be used to carry the sled and transport the objects over hard surface such as on terrain roads to reach an area covered with snow.

It should be understood that shape, size and placement of each component shown in figures are provided for illustrative purpose only and should not be construed in limited sense. A person skilled in the art will appreciate alternate parts and/or mechanisms that might be used to implement the embodiments of the present invention and such implementations will be within the scope of the present invention.

While preferred embodiments have been described above and illustrated in the accompanying drawings, it will be evident to those skilled in the art that modifications may be made without departing from this disclosure. Such modifications are considered as possible variants comprised in the scope of the disclosure.

What is claimed is:

1. A cart system for transporting objects over soft and hard surfaces, the cart system comprising:
   a cart including a base plate, toggles mounted to the base plate, wheels mounted to the base plate a cart handle mounted to the base plate, wherein said cart includes a first part and a second part, wherein the first part and the second part are coupled via a central hinge, wherein the second part is folded over the first part to fold the base plate;
   a sled including a bottom, sidewalls mounted to the bottom, clips mounted at the sidewalls and cables mounted to the sidewalls; and
   said sled holds objects at the bottom and within sidewalls, wherein the cables are used for pulling the sled over the soft surfaces for transporting the objects, and wherein the sled holding the objects is placed over the base plate, wherein the toggles are mounted to the clips to mount the cart to the sled, and wherein the cart handle is used for pulling the cart over the hard surface for transporting the objects.

2. The system of claim 1 wherein the first part and the second part include handles, wherein the handles facilitate carrying of the cart.

3. The system of claim 1 wherein the first part includes a latch and the second part includes a pin, wherein the latch is locked to the pin when the second part is placed over the first part.

4. The system of claim 1, wherein the sidewalls of the sled include eyelets, and wherein the cables are drawn through the eyelets.

5. The system of claim 1, wherein said wheels are removable.

6. The system of claim 1, wherein said cables are elastomeric tethers.

7. The system of claim 1, wherein the cart handle includes cart handle hinges allowing the cart handle to bend over the base plate and further for maneuverability of the cart handle 180 degrees due to the swiveling of at least one of the cart handle hinges.

8. The system of claim 7, wherein said cables are elastomeric tethers.

9. A cart system for transporting objects over soft and hard surfaces, the apparatus comprising:
a cart including a base plate, toggles mounted to the base plate, wheels mounted to the base plate and a cart handle mounted to the base plate, wherein said cart includes a first part and a second part, wherein the first part and the second part are coupled via a central hinge, wherein the second part is folded over the first part to fold the base plate; and
a sled including a bottom, sidewalls mounted to the bottom, eyelets provided at the sidewalls, clips mounted at the sidewalls and cables drawn through the eyelets, wherein the sled holds objects at the bottom and sidewalls, wherein the cables are used for pulling the sled over the soft surface for transporting the objects, and wherein the sled holding the objects is placed over the base plate, wherein the toggles are mounted to the clips to mount the cart to the sled, wherein the cart handle is used for pulling the cart over the hard surface for transporting the objects.

\* \* \* \* \*